United States Patent [19]

Bruenig

[11] 3,865,450
[45] Feb. 11, 1975

[54] SAFETY HEAD REST FOR AUTOMOBILE SEATS AND THE LIKE

[76] Inventor: Matthias Bruenig, 23 Parchimerstrasse, Hamburg, Germany

[22] Filed: Apr. 19, 1973

[21] Appl. No.: 352,547

[52] U.S. Cl. .............................................. 297/397
[51] Int. Cl. ........................... A47c 1/10, A47c 7/12
[58] Field of Search .......................... 297/397-402

[56] References Cited
UNITED STATES PATENTS

| | | | |
|---|---|---|---|
| 272,395 | 2/1883 | Wilson | 297/401 |
| 283,533 | 8/1883 | Taylor | 247/401 |
| 332,154 | 12/1885 | Jewett | 297/401 |
| 366,080 | 7/1887 | Doubleday | 297/401 |
| 394,649 | 12/1888 | Harrison | 297/401 |
| 415,326 | 11/1889 | Hill | 297/401 |
| 564,874 | 7/1896 | Dirkensen | 297/398 |
| 2,308,410 | 1/1943 | Winter | 297/403 X |
| 2,613,731 | 10/1952 | Roginski | 297/101 X |
| 2,801,677 | 8/1951 | Pinkerton et al. | 297/397 X |
| 3,114,527 | 12/1963 | Demarest | 297/397 |
| 3,129,975 | 4/1964 | Emery | 297/397 |
| 3,172,702 | 3/1965 | Rose | 297/397 |
| 3,304,120 | 2/1967 | Cramer | 297/397 X |

Primary Examiner—Paul R. Gilliam
Attorney, Agent, or Firm—Jacox & Meekstroth

[57] ABSTRACT

A safety head rest unit for automobile seats or the like, particularly in the form of a net extended or stretched over a frame fastened or integrally joined to the back of the seat.

7 Claims, 11 Drawing Figures

PATENTED FEB 1 1 1975 3,865,450

SAFETY HEAD REST FOR AUTOMOBILE SEATS AND THE LIKE

BACKGROUND OF THE INVENTION

Safety head rests of the net type referred to have been previously proposed and have the advantage that they considerably minimize rearward view obstruction for the driver. Furthermore, the interception of a rearwardly hurled head by a net can, in principle, be less dangerous than the resistance offered by conventional head supports. In spite of these advantages, previously proposed net head rest constructions have gained no general acceptance, particularly because they have been complicated and therefore expensive to manufacture. Furthermore, such structures have not been made absolutely tearproof, particularly at the joints of the net to the frame. These drawbacks are inherent in the conventionally proposed method of connecting the nets to the frame. In such structures every mesh of the net has been tied separately to the frame. To accomplish this, the single net strings have to be severely kinked, and this action tends to reduce the strength of the over-all structure. Moreover, with this type of construction for a head rest, it is mandatory to upholster the frame completely and this upholstering has been too labor-consuming and often repair-demanding and thus has not been economical.

It is now an object of the present invention to provide a head rest unit of the type referred to which avoids the shortcomings mentioned, which is simple in construction and effective in its action.

SUMMARY OF THE INVENTION

The objects set forth above and other objects, according to this invention, are realized in that portions of the frame are provided with paddings and that over both of these paddings a bag-shaped net is stretched.

The advantage of such a net head rest is an increased tear-resistance of the single net strings because they do not have to be kinked at the connection to the frame, and two layers of material of the flattened net unit are superimposed. Thus, each layer has to carry only one half of the total load. Furthermore, under load, a progressive yielding is effected in that, as a result of an impact, at first the front layer or wall yields relatively easily, whereupon, after striking the rear layer or wall, which now is more tensioned by the pulling action of the front layer, the resistance of the rear layer against yield is considerably increased. Owing to such compensation in the tension between front and rear layer of the net, a good dampening effect is achieved so that a rebounding of a passenger's head is practically avoided.

Installation and removal and exchange of nets is extremely simple. It is only necessary to pull the net hose or bag over the padded frame for installation or removal.

As an added feature of the invention, it is pointed out that, initially, the distance between the legs of the frame is preferably resiliently reduced immediately above the point where the legs join the seat back and that an elastic string is pulled through the meshes of the net at the lower open end of it. With this elastic string tied beneath the point of reduced leg distance, upward slipping of the net on the frame can be effectively prevented. Moreover, a tension in the net in a vertical direction can thereby be achieved so that the net hose or bag automatically stretches and adapts itself to a particular contour of the frame. However it should be understood that a resilient reduction in the distance between the legs at the upper seat back edge is not absolutely necessary and that sufficient vertical tension can also be obtained by proper connection of the net to the frame.

The frame or support structure of the head rest unit of this invention is, preferably, formed from suitable resilient spring steel. Thus, when properly coordinating the resilient properties of the frame and the net, it is possible to obtain an improved elastic condition of the head rest and an increased strength of the combined structure.

The upper cross connection of the frame can take various forms and is preferably bent backward with respect to the plane of the legs. When so formed, striking of the head against the cross bar under impact is effectively avoided and, in addition, a handle for a person in the rear seat can thus be provided.

In a modified construction, the cross bar may be divided and a resilient coil spring inserted to bridge this division. Such two-part frame may ease manufacture and render the frame more flexible through the resilient link. To take advantage of this added flexibility, the plane of the lower fixed portion of both legs should preferably lie behind the divided and flexibly joined cross bar. When so located, head pressure upon the net causes compression forces at the resilient link, and pressure from the rear tends to expand the coil spring at the link against the tension of the net, resulting in good head rest flexibility.

DESCRIPTION OF THE PREFERRED EMBODIMENTS

Figure 1:
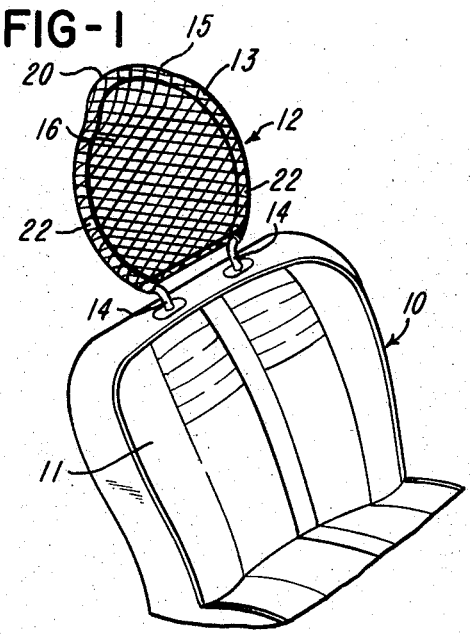
FIG. 1 is a perspective front view of an automobile seat equipped with a preferred embodiment of a head rest unit of this invention.
Figure 2:
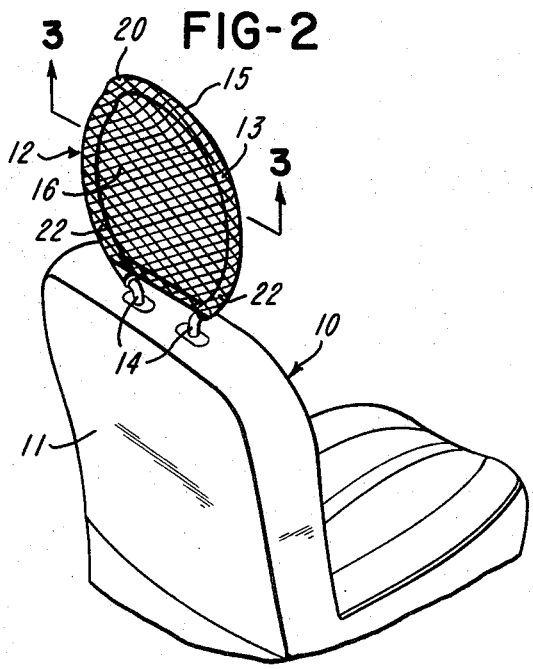
FIG. 2 is a perspective rear view of the same arrangement as shown in FIG. 1.

FIGS. 1 and 2 illustrate an automobile seat 10 having a seat back 11 to which is securely attached and anchored a head rest 12. Support structure in the form of a frame of the head rest 12 comprises a U-shaped bow having spaced-apart legs 22 with feet 14 for mounting to the seat back 11. The method of attaching the frame 13 to the seat back 11 is no part of this invention and can be accomplished in any suitable manner. An upper cross-connection or yoke 15 of the frame 13 is shown as having a portion 20 curved backwardly from the seat 10, as shown in FIG. 3, to provide a hand-grip, if desired.

Figure 4:
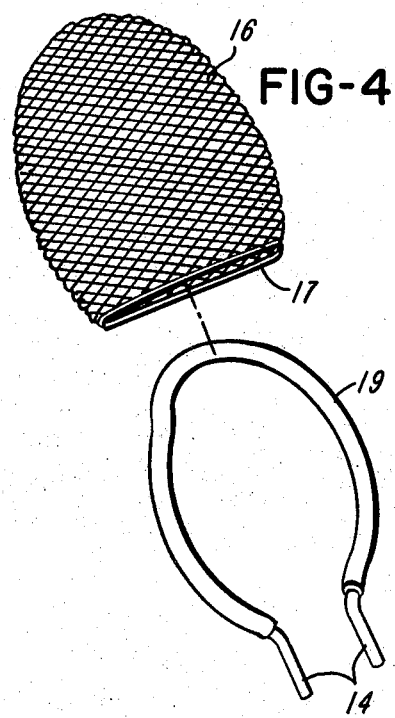
FIG. 4 is an exploded type of perspective view illustrating assembly of the head rest unit.
Figure 5:
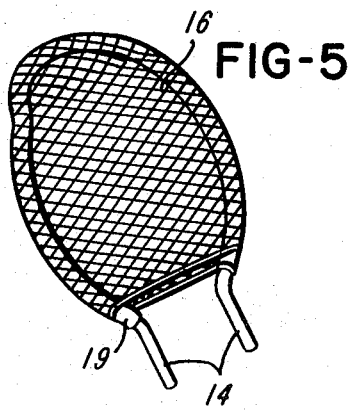
FIG. 5 is a perspective view of the head rest unit after assembly thereof.

Expanded over the frame 13 is a net 16, having the form of a bag or hose. As shown in FIGS. 4 and 5, there is pulled through the meshes of the net 16 at its lower end a string 17 which is tightened after the net 16 is pulled over the frame 13. Since the spacing between the feet 14 of frame 13 is less than the spacing between the legs 22, the net 16 is held in position by the tightened string 17 and thus is prevented from sliding upward. Moreover, the net 16 is thereby stretched and tightened vertically so that it closely fits any contour of the frame 13. If the net is in the form of a hose, that is open at its upper end also, a string, not shown, is disposed within the meshes of the net at each end thereof to prevent movement of the net 16 with respect to the frame 13. The net 16 may be of any desired mesh size.

Figure 3:
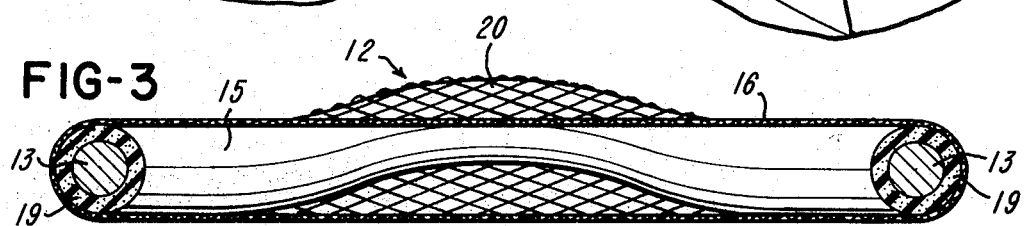
FIG. 3 is an enlarged sectional view taken substantially on line 3—3 of FIG. 2.

For protection against head injury, the frame 13 of the head rest 12 is preferably padded or imbedded in a structural plastic foam material 19, as shown in FIG. 3.

FIGS. 6–10

Figure 6:
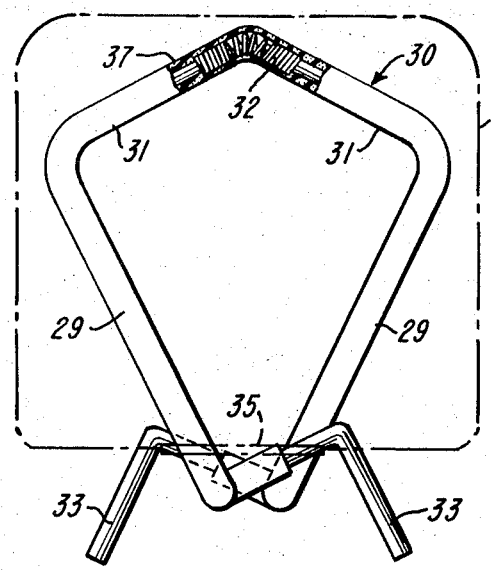
FIG. 6 is a plan view showing a modification in the support structure of a head rest unit of this invention and prior to installation.
Figure 7:
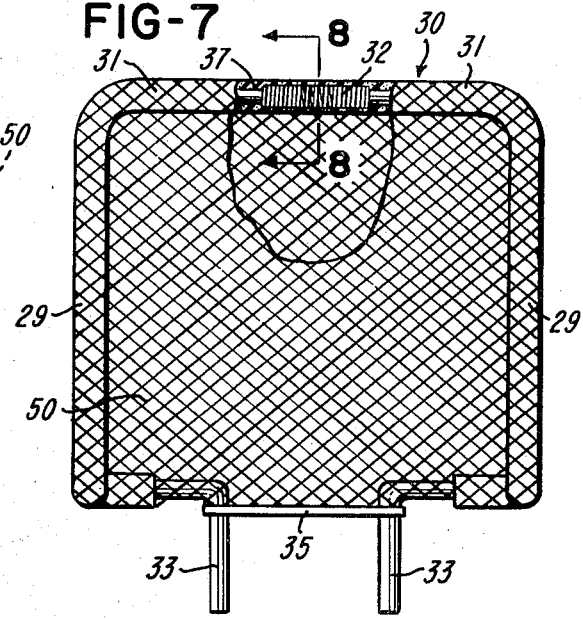
FIG. 7 is a plan view of the support structure of FIG. 6 following installation.
Figure 8:
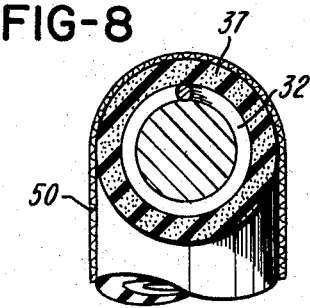
FIG. 8 is an enlarged sectional view, taken substantially on line 8—8 of FIG. 7.

A modification of the invention is shown in FIGS. 6 to 10. Here, a support structure in the form of a frame 30 has a pair of legs 29, each of which has a cross bar portion 31 at one end thereof, and a foot 33 at the other end thereof. Connecting the cross bar portion 31 is a resilient link 32. As shown in FIG. 8, the resilient link 32 is covered by a soft sleeve 37 of plastics material. The resilient link 32 makes possible the manufacture of the frame 30 in two parts, allows for convenient assembly of a net 50 to the frame 30, and renders flexibility to the entire head rest unit. In this case, the frame 30 in its unmounted condition has the legs 29 folded together as shown in FIG. 6. For securing the frame 30 to a seat, the frame 30 is brought into the form of FIG. 7, so that the feet may be secured in any suitable manner to a seat back. The feet 33, for example, may be inserted in holes in the seat back, not shown, or any suitable mounting of the frame 30 may be employed.

Figure 9:
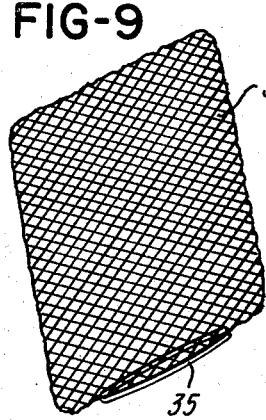
FIG. 9 is a perspective view illustrating a net bag having an unstretchable opening at its open lower end and adapted for use with the support structure shown in FIGS. 6 and 7.
Figure 10:
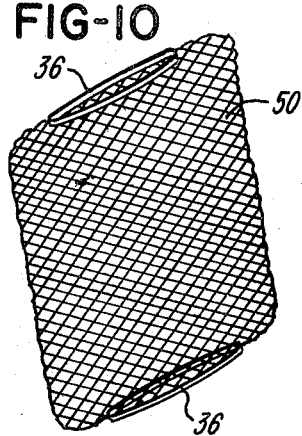
FIG. 10 shows a net hose having unstretchable openings at both ends and adapted for use with the support structure shown in FIGS. 6 and 7.

The construction of the frame 30 permits the use of the net 50 as either a hose or bag. FIGS. 9 and 10 show two different configurations of the net 50 for use with the frame 30. The net 50 shown in FIG. 9 is in the form of a bag closed at the top end and open at the bottom. At the bottom, there is an unstretchable band 35 around the opening. The net 50a shown in FIG. 10 is of the hose type with an unstretchable band 36 at each end thereof. The net 50 or 50a is superposed on the frame 30 when the frame 30 is in its collapsed condition shown in FIG. 6. When the frame 30 is expanded into the shape thereof shown in FIG. 7, the net 50 or 50a with its unstretchable bands 35 or 36 is securely held in position upon the frame 30.

Figure 11:
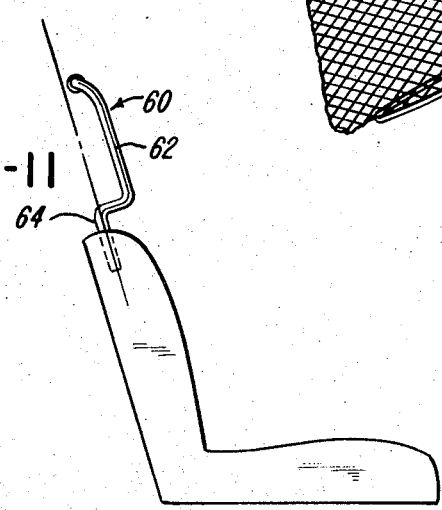
FIG. 11 is a side view of a seat equipped with a modified configuration of net head rest support structure of the invention.

FIG. 11 shows a frame having legs 62 provided with lower ends or feet 64. The lower ends 64 are angularly offset from the other parts of the legs 62. The upper portion of the frame 60 is slightly rearward of the main part of the legs 62. Preferably, the upper part of the frame 60 is provided with a resilient link, such as the resilient link 32 shown in FIGS. 6–8.

Thus, it is understood that a head rest unit of this invention has minimum view obstruction. The head rest unit is capable of excellent protection of a person whose head is forced into engagement therewith.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. An improved safety head rest unit for an automobile seat, comprising a substantially rigid frame having a pair of spaced leg portions each terminating with a lower portion adapted to be attached to the upper portion of the automobile seat, a net member mounted on said frame and including a front wall portion and a rear wall portion positioned in parallel spaced relation by said leg portions of said frame, at least said front wall portion and said rear wall portion of said net member being formed of a relatively coarse flexible netting material having sufficiently large openings to provide for a clear view through said wall portions, said leg portions of said frame having substantial thickness to provide for substantial spacing between said front and rear wall portions of said net member, and means operatively associated with said frame to maintain said front and rear wall portions of said net member in tension to effect rearward deforming of said front wall portion in response to an impact by a person's head until said front wall portion engages said rear wall portion and then combined rearward deforming of both said front and rear wall portions to assure a gradual increase in the resistance to rearward movement of the person's head.

2. The head rest unit of claim 1 in which the net member is in the form of a tube, open at opposed portions thereof.

3. The head rest unit of claim 1 in which a top portion of the frame is within a plane spaced from the plane of the leg portions.

4. The head rest unit of claim 1 which includes a resilient member positioned between the leg portions of the frame, the resilient member permitting relative movement between leg portions.

5. The head rest member of claim 4 in which a padding element covers the resilient member.

6. The head rest unit of claim 1 in which a protective plastics material covers at least a portion of the frame.

7. An improved safety head rest unit for an automobile seat, comprising a substantially rigid frame having a pair of spaced opposing leg sections each terminating with a lower portion adapted to be attached to the upper portion of the automobile seat, a spring member connecting the upper portions of said leg sections and providing for resiliently moving said lower portions closer together, a net member mounted on said frame and including a front wall portion and a rear wall portion positioned in parallel spaced relation by said leg sections of said frame, at least said front wall portion and said rear wall portion of said net member being formed of a relatively coarse flexible netting material having sufficiently large openings to provide for a clear view through said wall portions, said leg sections of said frame having substantial thickness to provide for substantial spacing between said front and rear wall portions of said net member, and means operatively associated with said frame to maintain said front and rear wall portions of said net member in tension to effect rearward deforming of said front wall portion in response to an impact by a person's head until said front wall portion engages said rear wall portion and then combined rearward deforming of both said front and rear wall portions to assure a gradual increase in the resistance to rearward movement of the person's head.

* * * * *